(12) United States Patent
Yates

(10) Patent No.: US 8,127,748 B2
(45) Date of Patent: Mar. 6, 2012

(54) FUEL PUMPING SYSTEM

(75) Inventor: Martin Kenneth Yates, East Haddon (GB)

(73) Assignee: Goodrich Control Systems, Solihull (GB)

( * ) Notice: Subject to any disclaimer, the term of this patent is extended or adjusted under 35 U.S.C. 154(b) by 281 days.

(21) Appl. No.: 12/511,531

(22) Filed: Jul. 29, 2009

(65) Prior Publication Data

US 2010/0024778 A1 Feb. 4, 2010

(30) Foreign Application Priority Data

Aug. 1, 2008 (GB) .................................... 0814025.3

(51) Int. Cl.
*F02M 37/06* (2006.01)
*F02M 37/04* (2006.01)

(52) U.S. Cl. ........................................................ 123/508

(58) Field of Classification Search .................. 123/495, 123/508, 1 A, 509, 198 C; 417/426, 199.1
See application file for complete search history.

(56) References Cited

U.S. PATENT DOCUMENTS

| 2,403,905 | A | * | 7/1946 | Brill ............................. 290/1 R |
| 4,586,468 | A | * | 5/1986 | Dzioba .................... 123/198 C |
| 5,413,466 | A | | 5/1995 | Bennett et al. |
| 5,669,842 | A | | 9/1997 | Schmidt |
| 2005/0232784 | A1 | * | 10/2005 | Yates et al. ................. 417/199.1 |

FOREIGN PATENT DOCUMENTS

GB 2180022 3/1987

* cited by examiner

*Primary Examiner* — Mahmoud Gimie
(74) *Attorney, Agent, or Firm* — Andrus, Sceales, Starke & Sawall, LLP

(57) ABSTRACT

A fuel pumping system comprises a high pressure pump having a drive input, a drive gear driven for rotation, in use, by the drive input, an idler gear driven by the drive gear, and an output gear driven by the idler gear, wherein the output gear is arranged to drive a rotor of an electrical generator and the idler gear is arranged to drive a rotor of a low pressure pump.

9 Claims, 1 Drawing Sheet

FUEL PUMPING SYSTEM

FIELD

This invention relates to a fuel pumping system, and in particular to a fuel pumping system suitable for use in aerospace applications, for use in supplying fuel to an aero-engine.

BACKGROUND

A typical fuel pumping system for an aero-engine comprises a low pressure (LP) pumping stage operable to draw fuel from a fuel tank, supplying the fuel to the inlet of a high pressure (HP) pumping stage. The LP pumping stage typically comprises a centrifugal impeller pump whilst the HP pumping stage typically comprises a positive displacement pump in the form of a twin pinion gear pump. A jet pump is often incorporated into the inlet side of the LP pumping stage, the jet pump serving to reduce the ratio of vapour to liquid at the inlet to the LP pumping stage, too high a proportion of vapour at the inlet to the LP pumping stage adversely affecting the performance thereof, or resulting in de-priming thereof.

Where an aero-engine is upgraded part way through its working life, one change which is sometimes desired to be made is to replace the control system associated with the engine. Older engines typically incorporate hydro-mechanical control systems and it is desirable to be able to introduce electronic control systems, and in particular to incorporate a full authority digital engine controller (FADEC) when making such upgrades. The electronic engine controller (EEC) which forms part of a FADEC usually requires a dedicated electrical power supply. Often, the accessory gear boxes associated with older engines do not include sufficient drive output pads to permit the simple addition of an electrical generator typically in the form of a permanent magnet alternator (PMA) to provide power for the EEC, and instead the generator has to share one of the drive pads with, for example, part of the pumping system. Older fuel pumping systems are typically designed to operate at relatively low rotational speeds, and in order to avoid having to provide a large electrical generator designed to provide a sufficient output at such low operating speeds it is often necessary to provide a gear arrangement to permit the generator to be driven at higher speeds, and thus allow a smaller, lighter weight unit to be used.

The gear arrangements used in such applications need to be lubricated. Oil/air mist lubrication is effective, but can only be used where a separate lubricating oil supply is available. Where this is not possible, fuel is used as the lubricant. As the use of a fuel/air mist for lubrication purposes would carry an unacceptable high risk of explosion, the lubrication is achieved by having the gear arrangement fully submerged or drowned in fuel. Although this achieves lubrication in a safe manner, the rotation of the gears of the gear arrangement in fuel rather than air increases the resistance to rotation thereof. These so-called windage losses are proportional to the density of the fluid in which the gears are rotated and as fuel has a density approximately 1000 times that of air, it will be appreciated that significant windage losses are incurred.

In addition to being related to the density of the fluid in which the gear arrangement is rotated, windage losses are also related to the diameters of the gears used. The sizing and installation configuration of the HP pumping stage and PMA typically require large gears to be used to straddle the relatively large spacing between their axes of rotation, thus further increasing the windage losses.

U.S. Pat. No. 5,669,842 and GB2180022 describe air/oil lubricated drive schemes intended for use in automotive applications. U.S. Pat. No. 5,413,466 describes a drive scheme for a fuel pumping system in which windage losses are reduced.

SUMMARY

It is an object of the invention to provide a fuel pumping system in which the disadvantages set out hereinbefore are overcome or are of reduced effect.

According to the present invention there is provided a fuel pumping system comprising a high pressure pump having a drive input, a drive gear driven for rotation, in use, by the drive input, an idler gear driven by the drive gear, and an output gear driven by the idler gear, wherein the output gear is arranged to drive a rotor of an electrical generator and the idler gear is arranged to drive a rotor of a low pressure pump.

It will be appreciated that such an arrangement permits driving of an electrical generator without requiring the associated accessory gear box to have a drive output pad dedicated to the electrical generator. The gears can be designed to permit the electrical generator to be rotated at a desired speed.

Conveniently, the drive gear, idler gear and output gear are located within a housing containing a lubricant. The lubricant is preferably engine fuel, and the gears are preferably drowned in the lubricant. It will be understood that such an arrangement permits safe lubrication of the gears.

Preferably, the drive gear, the idler gear and the output gear are of relatively small diameter, thereby reducing windage losses.

The invention will further be described, by way of example, with reference to the accompanying drawings, in which:

DETAILED DESCRIPTION

Figure 1:
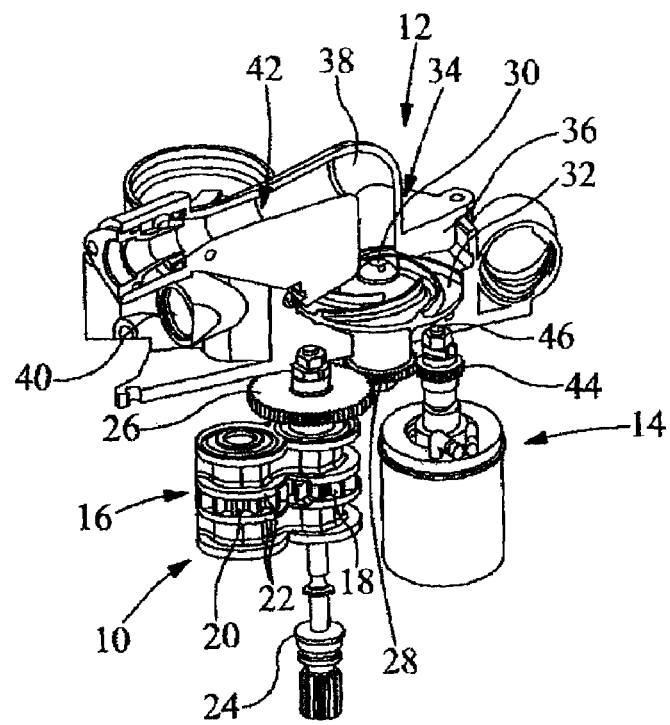
FIG. 1 is a perspective view of part of a fuel pumping system in accordance with one embodiment of the invention.
Figure 2:
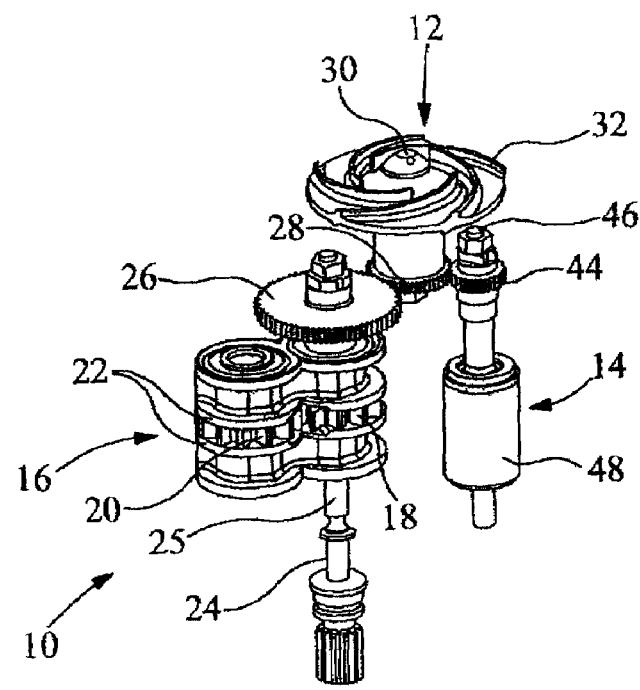
FIG. 2 is a view of the system of FIG. 1 with some parts removed, for clarity.

Referring to the accompanying drawings there is illustrated a fuel pumping system comprising a high pressure (HP) pumping stage 10, a low pressure (LP) pumping stage 12 and an electrical generator 14.

The HP stage 10 comprises a positive displacement pump in the form of a gear pump 16. The gear pump 16 is of substantially conventional form, including a first toothed gear 18, and a second toothed gear 20, the teeth of which are meshed with one another, the gears 18, 20 being sandwiched between bearing blocks 22. The gear pump 16 incorporates an input drive shaft 24 arranged to be driven by a drive output pad of an associated accessory gear box (AGB) (not shown). The drive shaft 24 is arranged to drive the gear 18 for rotation, which in turn, by nature of the meshing of the gear teeth, drives the gear 20 for rotation. Rotation of the gears 18, 20 positively displaces fuel from an inlet side of the gear pump 16 to an output side thereof, pressurising the fuel at the output side. An extension shaft 25, forming part of the drive shaft 24, is fixed into gear 18, onto which is mounted a drive gear 26 such that rotation of the drive shaft 24 results in operation of the gear pump 16 and in rotation of the drive gear 26.

The drive gear 26 is in meshing engagement with an idler gear 28 mounted upon a drive shaft 30 carrying the impeller 32 of a centrifugal pump 34 forming part of the LP stage 12. The impeller 32 is mounted for rotation within a housing 36 defining an inlet passage 38 opening substantially onto the axis of the impeller 32, and an outlet passage 40 arranged substantially tangentially to the impeller 32, the outlet passage 40 being connected, at its opposite end, to the inlet side of the gear pump 16, via engine pipework, a heat exchanger and a filter (none of which are shown). The inlet passage 38 is shaped to define a jet pump region 42, driven by a proportion of the fuel delivered to the outlet passage 40.

The idler gear 26 is in meshing engagement with an output gear 44 mounted upon the drive shaft 46 of a rotor 48 of the electrical generator 14, which typically takes the form of a permanent magnet alternator (PMA).

At least the drive gear 26, idler gear 28 and output gear 44 are located within a housing (not shown) containing fuel, the gears 26, 28, 44 being submerged or drowned in the fuel, the fuel serving to lubricate the gears.

In use, rotation of the input drive shaft 24 by the AGB drives the HP stage 10, LP stage 12 and generator 14 for rotation. The operation of the LP stage 12 results in fuel being drawn from an associated fuel tank and supplied to the inlet side of the HP stage 10. The jet pump region 42 serves to ensure that the ratio of liquid to vapour of the fluid entering the centrifugal pump 34 is sufficient to maintain good operation thereof, avoiding de-priming and increasing the positive suction pressure attained by the LP stage 12. The HP stage 10 operates to deliver fuel at high pressure to a fuel metering unit (not shown), controlling the delivery of fuel to the associated engine.

The operation of the PMA 14 supplies electrical power to an EEC and/or FADEC associated with the engine.

The three gears 26, 28, 44 are of relatively small diameter, compared to the situation where only two gears, and no idler gear, is provided, thus windage losses are relatively low. In addition to reducing windage losses, the idler gear 28 further serves to increase the operating speed of the LP stage 12, compared to arrangements in which it is driven directly from the HP stage. The gear ratios are chosen to ensure that the LP stage 12 and PMA rotor 48 can be driven at high speeds, thereby allowing a smaller size and lower weight LP stage 12 and PMA 14 to be used than would otherwise be the case. By way of example, it is envisaged that the input drive shaft 24 and HP stage 10 will be operated at a speed of approximately 7300 rpm, the idler gear 28 and LP stage 12 will be driven at a speed of approximately 13000 rpm, and the output gear 44 and PMA rotor 48 will be driven at a speed of approximately 25000 rpm, and the gear ratios of the gears 26, 28, 44 are chosen accordingly. Wear of fuel lubricated gears is often an issue, and to minimise wear of the gears, a harden gear material such as ASP 2053 or CPM10V is preferably used in the manufacture thereof.

It will be appreciated that a number of modifications and alterations may be made to the arrangement described hereinbefore without departing from the scope of the invention.

The invention claimed is:

1. A fuel pumping system comprising a high pressure pump having a drive input, a drive gear driven for rotation, in use, by the drive input, an idler gear driven by the drive gear, and an output gear driven by the idler gear, wherein the output gear is arranged to drive a rotor of an electrical generator and the idler gear is arranged to drive a rotor of a low pressure pump.

2. A system according to claim 1, wherein the drive gear, idler gear and output gear are located within a housing containing a lubricant.

3. A system according to claim 2, wherein the lubricant is engine fuel.

4. A system according to claim 2, wherein the gears are drowned in the lubricant.

5. A system according to claim 1, wherein the drive gear, the idler gear and the output gear are of relatively small diameter, thereby reducing windage losses.

6. A system according to claim 1, wherein the drive gear, the idler gear and the output gear are of a hardened gear material.

7. A system according to claim 1, wherein the gear ratios of the drive gear, the idler gear and the output gear are such that when the high pressure pump is driven at a speed of approximately 7300 rpm, the rotor of the low pressure pump is driven at a speed of approximately 13000 rpm and the rotor of the electrical generator is driven at a speed of approximately 25000 rpm.

8. A system according to claim 1, wherein the low pressure pump comprises a centrifugal pump, an impeller of which forms the rotor of the low pressure pump.

9. A system according to claim 8, further comprising a jet pump located at an inlet to the centrifugal pump.

\* \* \* \* \*